United States Patent
Hendriks et al.

(10) Patent No.: US 10,725,275 B2
(45) Date of Patent: Jul. 28, 2020

(54) STIMULATED EMISSION DEPLETION (STED) MICROSCOPY SYSTEM

(75) Inventors: Bernardus Hendrikus Wilhelmus Hendriks, Eindhoven (NL); Gert 'T Hooft, Eindhoven (NL); Jeroen Jan Lambertus Horikx, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 992 days.

(21) Appl. No.: 13/522,038

(22) PCT Filed: Jan. 13, 2011

(86) PCT No.: PCT/IB2011/050154
§ 371 (c)(1),
(2), (4) Date: Jun. 14, 2013

(87) PCT Pub. No.: WO2011/086519
PCT Pub. Date: Jul. 21, 2011

(65) Prior Publication Data
US 2014/0145093 A1  May 29, 2014

Related U.S. Application Data

(60) Provisional application No. 61/295,369, filed on Jan. 15, 2010.

(51) Int. Cl.
*G02B 21/00* (2006.01)
*G01N 21/64* (2006.01)

(52) U.S. Cl.
CPC ......... *G02B 21/0076* (2013.01); *G01N 21/64* (2013.01); *G01N 21/6458* (2013.01); *G02B 21/0032* (2013.01)

(58) Field of Classification Search
CPC ............ G02B 21/0032; G02B 21/0076; G01N 21/64; G01N 21/6458
See application file for complete search history.

(56) References Cited

U.S. PATENT DOCUMENTS

2004/0207854 A1  10/2004  Hell et al.
2005/0275814 A1* 12/2005  Eib .................... G03F 7/70283
                                                     355/18
(Continued)

FOREIGN PATENT DOCUMENTS

DE  202009007250    12/2009
JP  2003167198 A    6/2003
(Continued)

OTHER PUBLICATIONS

Lee et al. Optical vortex beam shaping by use of highly efficient irregular spiral phase plates for optical micromanipulation, Optics Letters, vol. 29, No. 15 (Aug. 2004), pp. 1796-1798.*
(Continued)

*Primary Examiner* — David P Porta
*Assistant Examiner* — Shun Lee

(57) ABSTRACT

The invention discloses an optical microscopy system (10) for stimulated emission depletion (STED) of an object (O). An optical element (6) is applied for focusing a first excitation (1) and a second depletion (2) beam on the object thereby defining a common optical path (OP) for both the first and the second beam. A phase modifying member (5) is inserted in the common optical path (OP), and the phase modifying member is optically arranged for leaving the wavefront of the first beam substantially unchanged, and for changing the wavefront of the second beam (2') so as to create an undepleted region of interest (ROI) in the object. The first beam and the second beam have a common optical path because the phase modifying member adapts the wavefront or phase in such a way that it has no effect on the first beam, while on the second beam it gives rise to a wavefront, or phase change, resulting in a depleted region in the object (e.g. to the donut shaped spot) at the focal plane. The invention facilitates smaller and/or improved optical designs
(Continued)

for STED microscopy; this is particularly relevant for medical in-vivo imaging, e.g. endoscopes and catheters.

11 Claims, 11 Drawing Sheets

(56) References Cited

U.S. PATENT DOCUMENTS

| | | |
|---|---|---|
| 2010/0282954 A1 | 11/2010 | Hendriks et al. |
| 2011/0186754 A1 | 8/2011 | Dodt |
| 2014/0145093 A1 | 5/2014 | Hendriks et al. |

FOREIGN PATENT DOCUMENTS

| | | |
|---|---|---|
| JP | 2003344777 A | 12/2003 |
| WO | WO2006097063 | 9/2006 |
| WO | WO2008145371 | 12/2008 |
| WO | WO2009087527 | 7/2009 |

OTHER PUBLICATIONS

B.H.W. Hendriks et al., "Miniaturised High-Numerical Aperture Singlet Plastic Objective Recording", Japanese Journal of Applied Physics, vol. 44, No. 9A, 2005, pp. 6564-6567.

M.A.H. Van Der Aa et al., "Small Form Factor Optical Drive: Miniaturized Plastic High-NA Objective and Optical Drive", Proceedings from Joint International Symposium on Optical Memory and Optical Data Storage 2002, IEEE, pp. 251-253.

B. Harke et al., "Resolution Scaling in STED Microscopy", Optics Express 16 (2008), pp. 4154-4162.

L. Fu et al., "Nonlinear Optical Microscopy Based on Double-Clad Photonic Crystal Fibers", Optics Express 5528, Jul. 2005, vol. 13, No. 14.

D. Wildanger et al., "A STED Microscope Alighed by design", Optics Express, vol. 17, No. 18, Aug. 31, 2009, pp. 16100-16110.

M. Reuss et al., "Birefringent Device Concerts a Standard Scanning Microscope Into a STED Microscope that Also Maps Molecular Orientation", Optics Express, vol. 18, No. 2, Jan. 18, 2012, pp. 1049-1058.

Reuss, M. et al, "Birefringent device converts a standard scanning microscope into a STED microscope that also maps molecular orientation", Optics Express, vol. 13, No. 2, Jan. 7, 2010, p. 1049-1058.

Ozgur, K. et al., "Design of a self aligned, wide temperature range atomic force microscope/magnetic force microscope with 10 nm magnetic force microscope resolution", Review of Scientific Instruments, NY, vol. 85, Nr: 10.

M.A.H. van der Aa et al., "Small Form Factor Optical Drive: Miniaturized Plastic High-NA Objective and Optical Drive", Conference Paper. 2002. The Netherlands. pp. 251-253.

* cited by examiner

STIMULATED EMISSION DEPLETION (STED) MICROSCOPY SYSTEM

FIELD OF THE INVENTION

The present invention relates to an optical microscopy system for stimulated emission depletion (STED), and a corresponding method for performing microscopy with such a system. The invention also relates to a corresponding optical sub-unit, preferably forming part of an endoscope, a catheter or a needle, or similar devices, for medical imaging.

BACKGROUND OF THE INVENTION

In stimulated emission depletion (STED) microscopy, the image resolution can be achieved well below the diffraction limit of conventional microscopy (see for instance FIG. 2 in B. Harke, J. Keller, C. K. Ullal, V. Westphal, A. Schönle and S. W. Hell, "Resolution scaling in STED microscopy", Optics Express 16 (2008) p. 4154-4162. In STED microscopy, a fluorescence marker is excited by a pulsed laser system. Shortly after this excitation i.e. within the decay time of the fluorescence a second laser pulse is applied having a wavelength close to the wavelength of the emission wavelength of the fluorescence. This second laser pulse has a donut shaped spot (or other similar shapes differing from the shape of the first pulse). Due to stimulated emission this second pulse will de-excite the fluorescence molecules within the donut shaped spot region. However the molecules within the center of the donut will not be de-excited. This center region is in general smaller than the diffraction limited spot size of the conventional microscope. Hence detecting the fluorescence coming from the remaining excited molecules after the two laser pulses originate from a region smaller than the diffraction limit, hence producing sub diffraction limited resolution of imaging. This has recently attracted some attention in this technical field.

To produce the two pulsed laser beams typically the optical setup shown in FIG. 1 of the above reference by Harke et al. is used. This causes severe constraints on the beam alignment in all three spatial dimensions, and typically re-alignment is periodically needed due to mechanical, thermal, and/or optical beam drift in the optical setup. Furthermore, the depletion beam requires different optical components in order to produce the donut shape spot. Similarly, the two laser beams puts a constraint on the possible downscaling of the optical STED microscopy, which is of paramount importance for in-vivo medical and biological imaging.

In connection with an optical fiber scanner, cf. for example international patent application WO 2009087527 by the present applicant, it may be mentioned that for such applications one generally prefers to have a common optical beam path for the excitation beam and the STED beam.

The inventors of the present invention have appreciated that an improved STED microscopy system is of benefit, and has in consequence devised the present invention.

SUMMARY OF THE INVENTION

It would be advantageous to achieve an improved microscopy system. It would also be desirable to enable a more compact and/or robust microscopy system. In general, the invention preferably seeks to mitigate, alleviate or eliminate one or more of the above mentioned disadvantages singly or in any combination. In particular, it may be seen as an object of the present invention to provide a method that solves the above mentioned problems, or other problems, of the prior art.

To better address one or more of these concerns, a first aspect of the invention relates to an optical microscopy system for stimulated emission depletion (STED) of an associated object, the system comprising:

radiation generating means capable of emitting a first and a second beam, the first beam being an excitation beam, the second beam being a depletion beam relative to the first beam, an optical element for focusing the first and the second beam on the object, the optical element being arranged relative to the radiation generating means for defining a common optical path for both the first and the second beam, and a phase modifying member inserted in said common optical path, wherein the phase modifying member is optically arranged for leaving the wavefront of the first beam substantially unchanged, and for changing the wavefront of the second beam so as to create an undepleted region of interest in the object.

The invention is particularly, but not exclusively, advantageous for obtaining a more compact and/or robust STED microscopy system, where the first excitation beam and the second depletion beam have a common optical path, as defined by the optical element focusing the beams, due to the phase modifying member adapting the wavefront or phase in such a way that it has no effect on the first beam, while on the second beam it gives rise to a wavefront, or phase change, resulting in a depicted region in the associated object (e.g. to the donut shaped spot) at the focal plane.

It should be noted that hitherto in this technical field, in order to provide, for example, a "donut" shaped beam, a phase plate has been used in one of the two pulsed laser beams of the STED setup. A drawback of this construction was that the phase plate must be in one of the beams and cannot be placed in the both beams together. Thus, when implementing the STED technique in to a miniature microscope, such as a fiber scanner, this restriction has previously limited the possible downscaling of the miniature microscope. In connection with an optical fiber scanner, cf. for example international patent application WO 2009087527 by the present applicant, which is hereby incorporated by reference in its entirety, it may be mentioned that for such applications the phase modifying member may be positioned between the fiber 2 and the objective lens 6a of FIG. 4 in WO 2009087527.

It is to be understood that, in the context of the present invention, the phase modifying member has no, or substantially no, effect on the first excitation beam in the sense that from a practical point there will typically be a small wavefront or phase changes induced but this change has no, or at least insignificantly, consequences for the stimulated emission depletion image obtained. Below this will be more elaborately explained.

In a particular advantageous embodiment, the phase modifying member may be capable of modifying the wavefront of the second beam by having a surface with a plurality of regions comprising a first and a second region, the first region having a protruded height which is above the height of the second region. By having a protrusion, or a step, between the heights of the first and the second regions, it is possible to produce a phase modifying member in a relatively simple way, e.g. in a single material applying high precision manufacturing method to produce a step height with typically sub-micrometer precision. Needless to say, this may be generalized to more than two regions, i.e. three, four, five, six, seven, eight, nine, ten, etc. regions, each region having a protrusion to match the overall technical purpose of the phase modifying member. This is possible by using techniques known from high precision lens manufacturing; cf. for example Japanese Journal of Applied Physics, Vol. 44, No. 9A, 2005, pp. 6564-6567, *Miniaturised High-Numerical Aperture Singlet Plastic Objective for Optical Recording*, by B. H. W. Hendriks et al. and *Small Form Factor Optical Drive: Miniaturized Plastic High-NA Objective and Optical Drive*, by M. A, H, van der Aa et al. in Proceedings from Joint International Symposium on Optical Memory and Optical Data Storage 2002, IEEE, p. 251-253, which are both hereby incorporated in their entirety by reference. This is especially beneficially as compared to using two or more different optical material to produce the technical effect of the present invention which typically requires relative complicated matching/interfacing of optical, thermal, and mechanical parameters.

In an additional advantageous embodiment, the phase modifying member may be capable of leaving the wavefront of the first beam substantially unchanged by changing the phase of the first beam in modulus of 2 times pi ($\pi$). In that way, there is no need for matching for example the optical properties of two, or more, different materials.

A further advantage worth mentioning is the fact that for the phase modifying member, the required step heights are in general relatively small (of the order of a few microns) making the member relative easy from a manufacturing point of view. Furthermore, the width of the steps can be large relative to the step height. These properties of the stepped phase structure makes them relatively easy to manufacture with current lens making technology, cf. above cited references.

In the above-mentioned preferred embodiment, where the phase modifying member may be capable of modifying the wavefront of the second beam by having a surface with a plurality of regions comprising a first and a second region, the first region having a protruded height which is above the height of the second region, the surface may be the outer surface of the phase modifying member which enables simple manufacturing. Additionally or alternatively, the phase modifying member may be capable of leaving the wavefront of the first beam substantially unchanged by changing the phase of the first beam in modulus of 2 times pi ($\pi$). To increase simplicity and/or ease manufacturing, the plurality of regions of the surface of the phase modifying member may be manufactured in one optical material, preferably the entire phase modifying member may be manufactured in one optical material.

In an advantageous embodiment, at least said optical element and the phase modifying member is positioned in an endoscope, a catheter, or a needle for medical imaging, e.g. for in-vivo optical imaging where the requirements on miniaturization are particularly demanding.

In one embodiment, the phase modifying member may have an azimuthal configuration, wherein each region, from said plurality of regions, is positioned within an azimuthal angle interval. It is preferred that that the common optical path passes through a central, or substantially central, position of the phase member. Furthermore, the plurality of regions may have consecutively increasing heights at the surface of phase modifying member, e.g. discrete steps, 3, 4, 5 or more, along the azimuthal coordinate, cf. FIG. 3 and the corresponding explanation below. In other variants, the plurality of regions may not have consecutively increasing heights at the surface of phase modifying member, but rather increasing and decreasing height along the azimuthal coordinate.

In a particular embodiment, the heights at the surface of phase modifying member may have a height distribution so that the modified phase of the second beam as function of the azimuthal angle, $\Phi(\varphi)$, is approximately equal to the azimuthal angle;

$$\Phi(\varphi)=\varphi \text{ for } \varphi \in [0,2\pi)$$

Strictly speaking, this can only be fulfilled for a continuous height distribution but for various height distributions this may be reasonable approximated. Alternatively, the condition may be approximated at an average angle of segments.

In a further particular embodiment, the second beam spot amplitude, U, at the focal plane of the focusing optical element, may be approximately zero at a central position of the optical path (r=0), by requiring that the phase modifying member approximately fulfills the equation:

$$\sum_k w_k e^{i\Phi_k} = 0,$$

where k denotes the segment number, $\Phi_k$ the segment phase, $w_k$ the segment size which equals the ending angle minus the starting angle of segment k. As an alternative to the so-called "donut" configuration, this equation encompasses a range of other optical configurations of the modifying member fulfilling the essential STED requirement.

In an alternative embodiment, the second beam spot amplitude, U, at the focal plane of the focusing optical element, may be approximately rotationally symmetric around the common optical path by requiring that the phase modifying member approximately fulfills the equations:

$$\left| \frac{\sum_k e^{i\Phi_k} \cos\varphi_k \sin\frac{w_k}{2}}{\sum_k e^{i\Phi_k} \sin\varphi_k \sin\frac{w_k}{2}} \right|^2 - 1 = 0 \text{ and}$$

$$\text{Re}\left( \frac{\sum_k e^{i\Phi_k} \cos\varphi_k \sin\frac{w_k}{2}}{\sum_k e^{i\Phi_k} \sin\varphi_k \sin\frac{w_k}{2}} \right) = 0,$$

where k denotes the segment number, $\Phi_k$ the segment phase, $w_k$ the segment size which equals the ending angle minus the starting angle of segment k. Thus, these two equations define design rules for the skilled person that enables many different optical embodiments of the phase modifying member according to the present invention.

In a quite different embodiment, the first and second regions of the phase modifying member may be rotationally symmetric around the common optical path. This enables other simple and advantageous embodiments of the present invention, see FIG. 10 and the corresponding description below.

In a second aspect, the present invention relates to an optical sub-unit arranged for optical imaging of an associated object using stimulated emission depletion (STED) in an associated optical microscopy system, the associated optical microscopy system comprises radiation generating means capable of emitting a first and a second beam, the first beam being an excitation beam, the second beam being a depletion beam relative to the first beam, the optical sub-unit comprising:

optical guiding means for guiding the first and the second beam through the sub-unit, an optical element for focusing the first and the second beam on the object, the optical element being arranged relative to the radiation generating means for defining a common optical path for both the first and the second beam, and a phase modifying member inserted in said common optical path, wherein the phase modifying member is optically arranged for leaving the wavefront of the first beam substantially unchanged, and for changing the wavefront of the second beam so as to create an undepleted region of interest in the object.

Preferably, the optical sub-unit may be arranged for optical imaging of an associated object using stimulated emission depletion (STED) in an associated optical microscopy system according to the first aspect, wherein the optical sub-unit forms part of an endoscope, a catheter, a needle or a biopsy needle for medical imaging. Other kind of imaging devices is also envisioned within the teaching and general principle of the present invention, non-medical included. In the medical field, this is particular advantageous because there this kind of devices are typically disposed after a single use due to sanitary regulations, and the relative simple manufacturing of these medical devices according to the present invention facilitate the more widespread use and application of the advantageous medical devices.

In a third aspect, the present invention relates to a method for performing optical microscopy with stimulated emission depletion (STED) of an object, the method comprising:

emitting radiation comprising a first and a second beam, the first beam being an excitation beam, the second beam being a depletion beam relative to the first beam, focusing the first and the second beam on the object using an optical element, the optical element defining a common optical path for both the first and the second beam, and providing a phase modifying member in said common optical path, wherein the phase modifying member is optically arranged for leaving the wavefront of the first beam substantially unchanged, and for changing the wavefront of the second beam so as to create an undepleted region of interest in the object. The invention, according to this aspect, is particular advantageous in that some optical STED microscopy system may be modified and/or updated to work according to the present invention.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
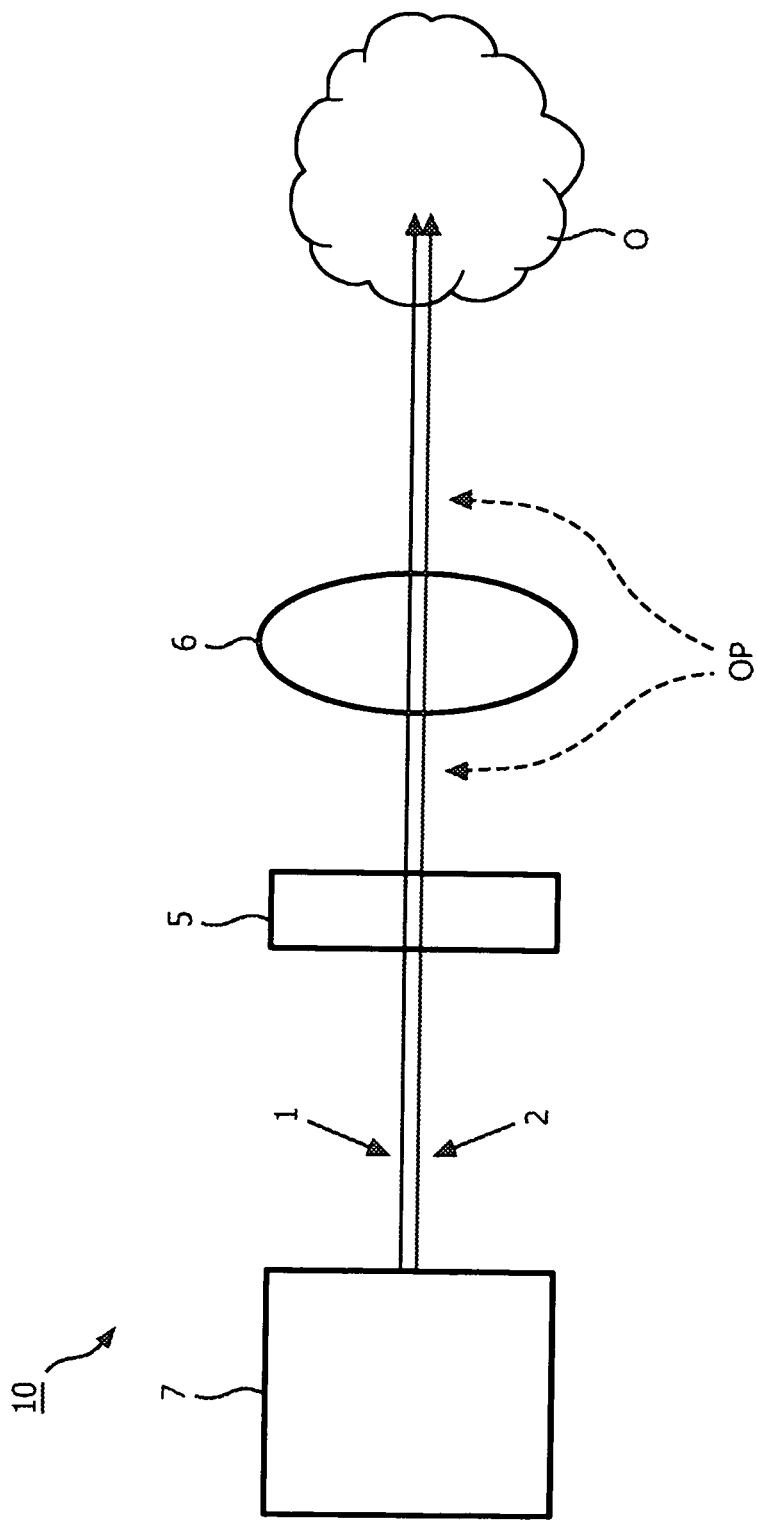
FIG. 1 is a schematic drawing of the optical microscopy STED system according to the present invention.

FIG. 1 is a schematic drawing of the optical microscopy STED system 10 according to the present invention. The optical microscopy system 10 is adapted for stimulated emission depletion (STED) imaging of an associated object O (not forming part of the optical system itself), cf. Harke, J. Keller, C. K. Ullal, V. Westphal, A. Schönle and S. W. Hell, "*Resolution scaling in STED microscopy*", *Optics Express* 16 (2008) p. 4154-4162, which is hereby incorporated by reference in its entirety, for further technical details on the STED method.

The optical system 10 comprises radiation generating means 5, e.g. two or more pulsed lasers or a single tunable laser or other suitable radiation generators, capable of emitting at least a first 1 and a second 2 beam. The first beam 1 is an excitation beam, e.g. for fluorescence imaging of the object, the second beam 2 being a depletion beam relative to the first beam 1, typically with red-shifted energy i.e. lower energy, for causing a depletion in a zone in the object O.

Additionally, an optical element 6, e.g. a lens or other components having non-zero optical power, is provided for focusing the first 1 and the second 2 beam on the object O. The optical element is arranged relative to the radiation generating means 7 for defining a common optical path OP for both the first 1 and the second 2 beam. In FIG. 1, the first 1 and the second 2 beams are shifted vertically merely for reasons of clarity in the figure, the spatial overlap typically being maximized in actual implementations as far as possible for utilizing the beams.

Furthermore, a phase modifying member 5 is inserted in said common optical path OP, the phase modifying member 5 being optically arranged for leaving the wavefront of the first beam 1 substantially unchanged, and for changing the wavefront of the second beam 2 so as to create an undepleted region of interest in the object O. Equivalently, it may be said that the phase modifying member 5 is optically arranged for changing the phase of the first beam with an integer times 2 pi ($\pi$), i.e. effectively leaving the phase unchanged, and also for changing the phase of the second beam differently from an integer times 2 pi so as to create an undepleted region of interest in the object. This facilitates the use of a single beam path, i.e. along the common optical path, in connection with STED microscopy providing numerous advantages, in particular easier use and/or more compact optical design.

It is contemplated that the phase modifying member 5 and the optical element 6 may be combined into a single entity (not shown) having similar, or equivalent, functionalities as the two separate entities.

Figure 2:
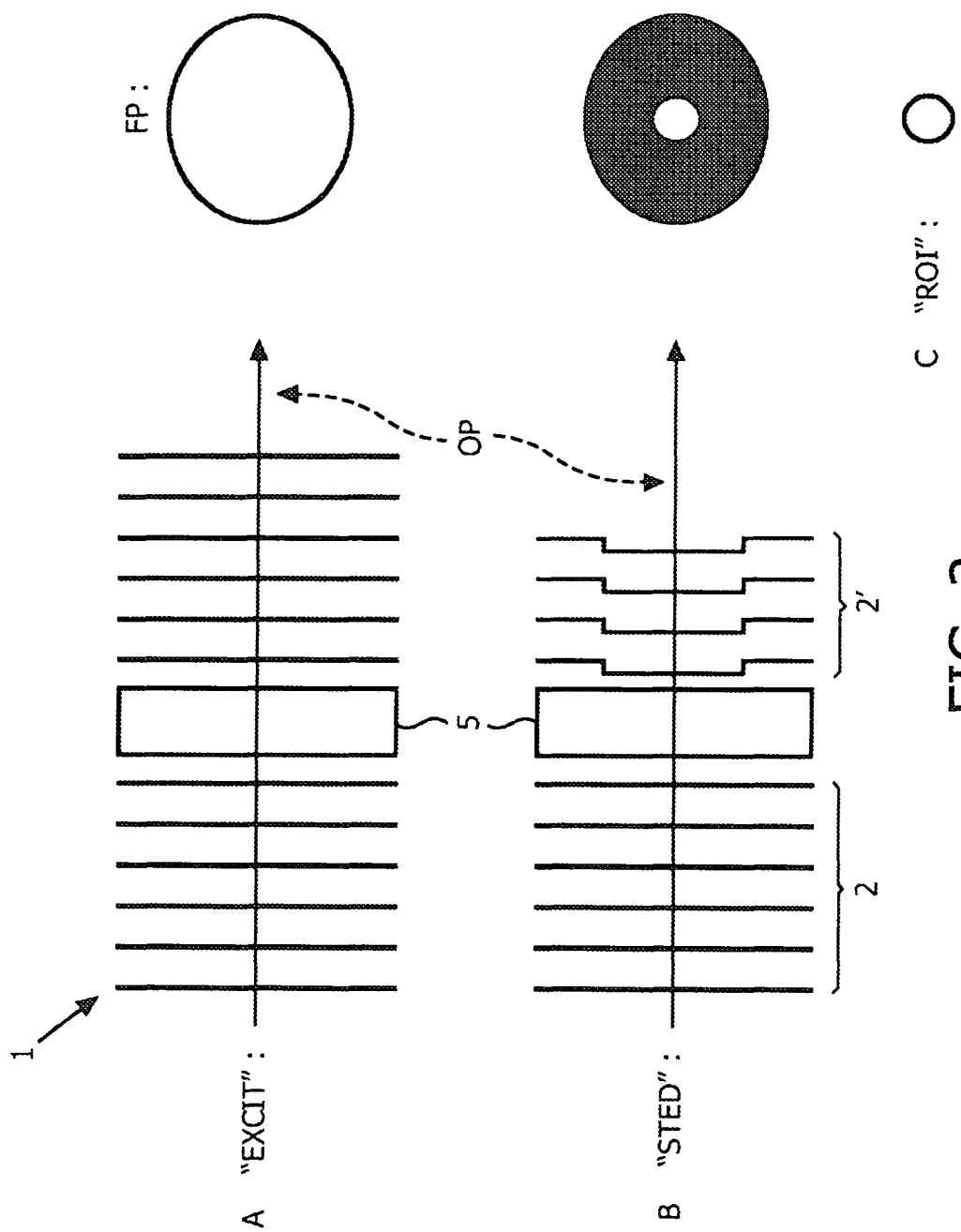
FIG. 2 is a schematic illustration of the wavefronts of the first and second beams according to the present invention.

FIG. 2 is a schematic illustration of the wavefronts of the first 1 and second 2 beams according to the present invention along the optical path OP, where the two beams are shown to two different times; at time=A "EXCIT", the first excitation beam 1 is shown passing through the phase modifying member 5 and the wavefronts are unchanged, or equivalently, there is no optical aberration of the first beam. It should be noted that this is typically highly dependent on the wavelength of the first beam 1.

Subsequently, at time=B "STED", the wavefronts of the second depletion beam 2 are shown passing through the phase modifying member 5, with the result that the wavefronts 2' are changed, schematically indicated by the breaks in the wavefronts 2'. The changing the wavefront of the second beam 2 should be dimensioned to create an undepleted region of interest ROI in the object O. This will be explained in more details below.

To the right in FIG. 2, the corresponding focal planes FP are shown for the different times, at time=A "EXCIT, a circle is illuminated with radiation capable of causing e.g. fluorescence in the object O. At time=B "STED", the modified depletion beam 2' causes a depletion in a circumferential region; schematically indicated with black around the circular undepleted area in FIG. 2. At a later time=C "ROI", fluorescence will only, or primarily depending on the degree of depletion, originate from the central region of interest ROI, which may have a spatial extension (e.g. diameter of the circle) below the wavelength of the fluorescence emitted, i.e. below the diffraction limit.

Figure 3:
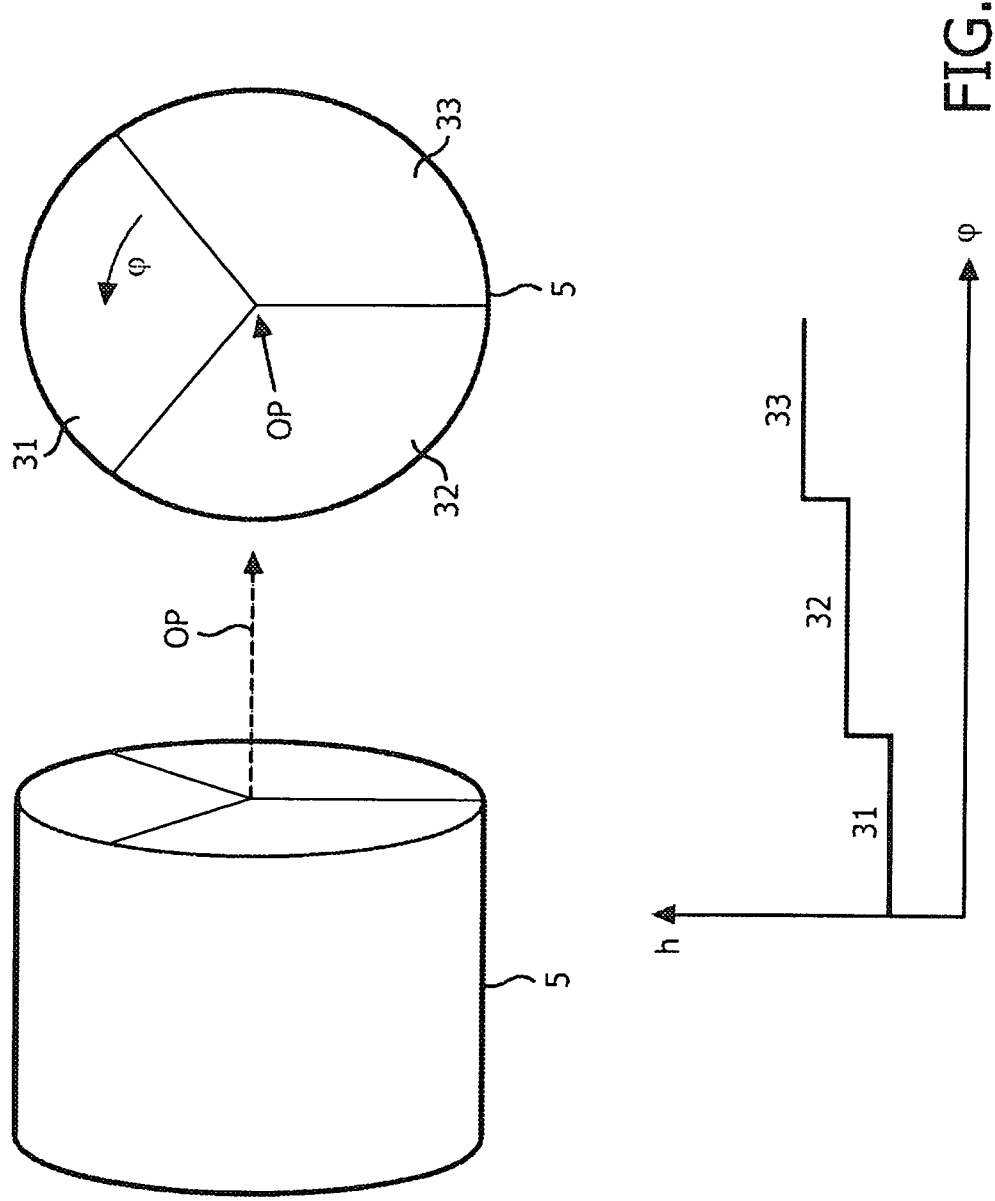
FIG. 3 is more detailed schematic illustration from different views of the phase modifying member with an azimuthal configuration according to the present invention.

FIG. 3 is more detailed schematic illustration from different views of the phase modifying member 5 with an azimuthal configuration according to the present invention. By azimuthal configuration is meant a configuration that may reasonably be represented or approximated by a configuration described by conventional cylindrical coordinates around a central axis i.e. the common optical path OP. The member 5 shown in FIG. 3 comprises three regions or azimuthal segments 31, 32, and 33, where the phase modifying member 5 is capable of modifying the wavefront of the second beam 2 by having a surface with a plurality of regions comprising at least a first 31, a second 32 and a third 33 region, the second region 32 having a protruded height h which is above the height of the first region 31, and further the third region or segment 33 has a height above the second region 32. This is illustrated in the graph below the member 5 showing the height h versus the azimuthal angle, (φ.

It should be mentioned that the surface of the member 5 may be interfaced with another optical material or medium, e.g. glass, polymer, or air, so that the effective wavefront change should take this into account when designing the phase modifying member. Typically, it will for reason of simplicity in the manufacturing process be a member 5 made in a single material, e.g. polymer like PMMA, polycarbonate, COC, curable resins like diacryl. Thus, the different heights of the different regions could be on the outer surface of the member 5, as also illustrated in FIG. 3.

Figure 4:
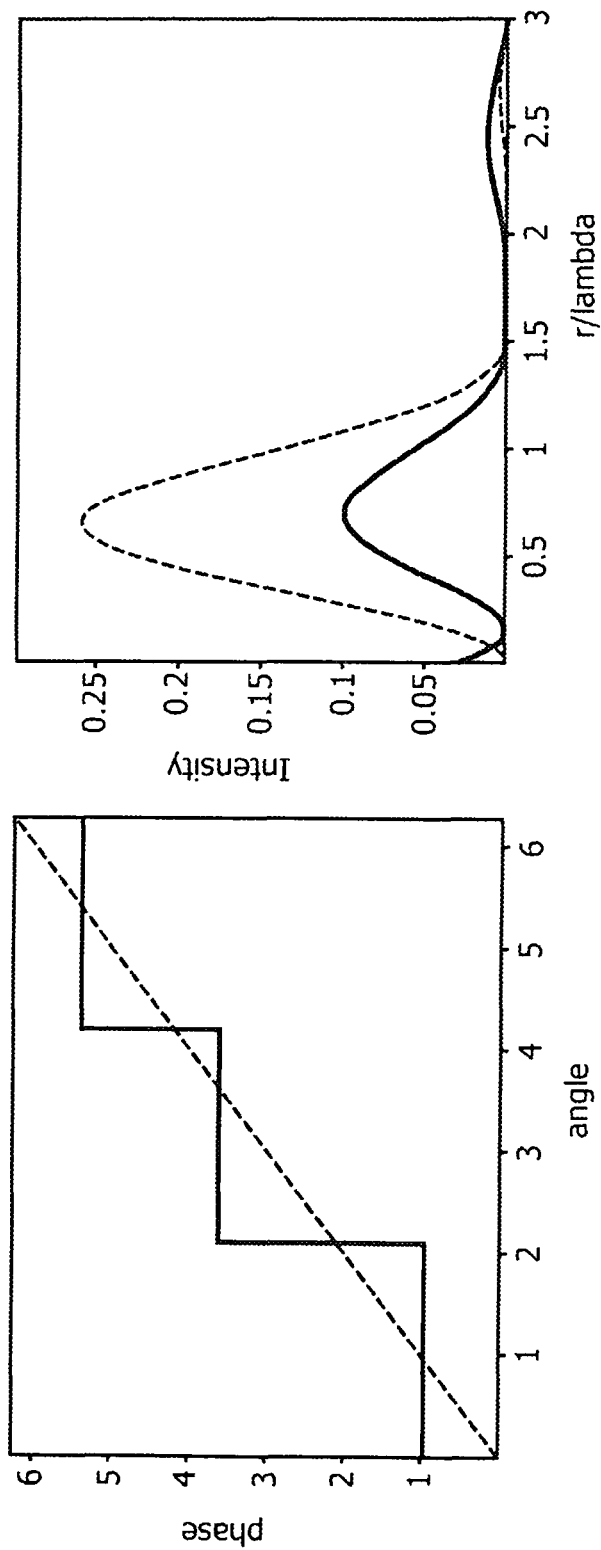
FIG. 4-6 show 3 sets of graphs showing corresponding phase versus angle (to the left), and the resulting spot distribution in the focal plane versus scaled radial distance (to the right)
Figure 5:
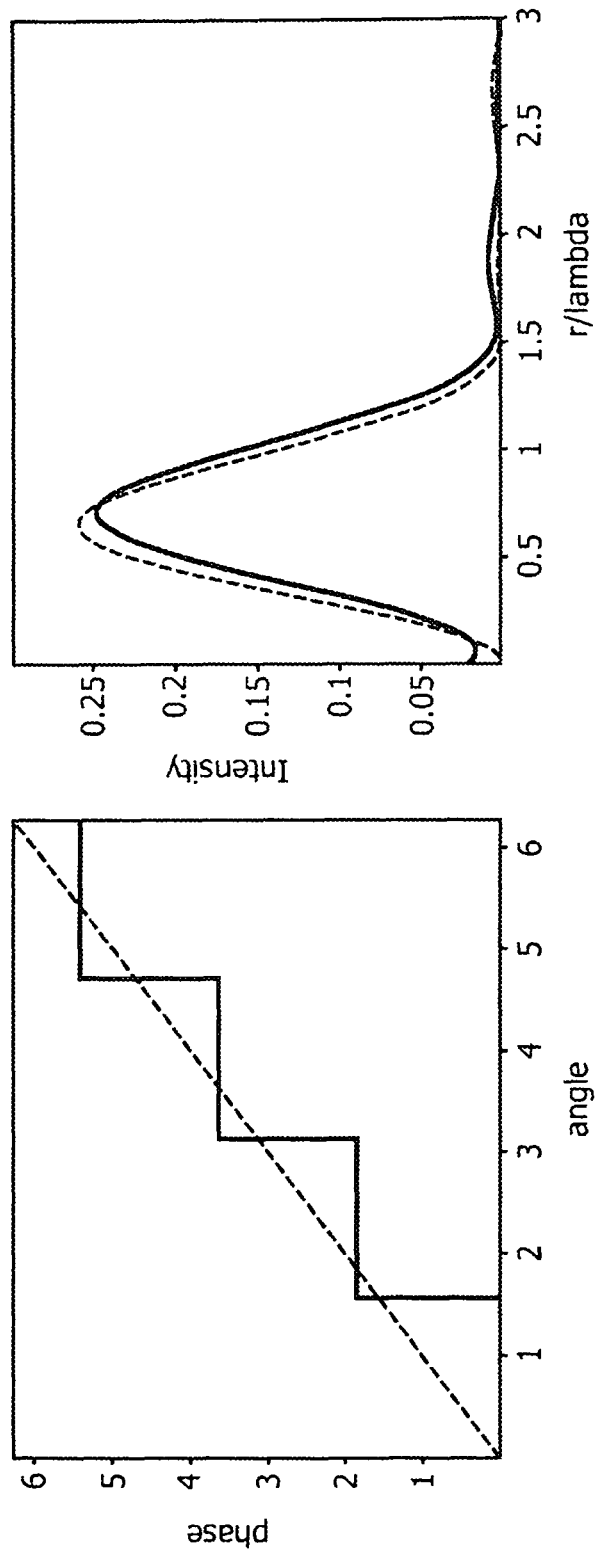
Figure 6:
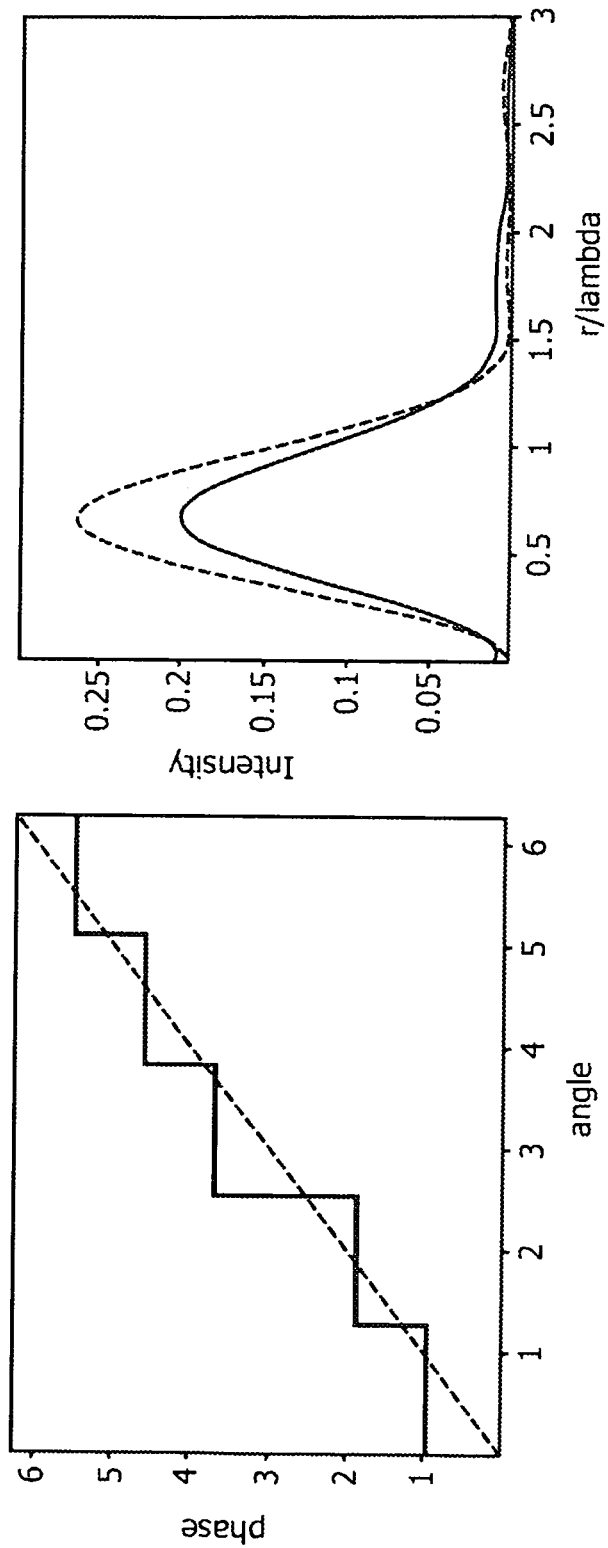

FIG. 4-6 show 3 sets of graphs showing corresponding phase versus angle (to the left), and the resulting spot distribution in the focal plane versus scaled radial distance (to the right) for a specific example.

Let the phase modifying member 5 be made of PMMA. At the excitation wavelength 635 nm, the refractive index of PMMA is 1.490, while at the depletion wavelength 735 nm, it is 1.487. Let the phase plate introduce a phase $\Phi(\varphi)$ to the wavefront. Let the numerical aperture NA of the depletion beam be NA=0.6. The STED spot amplitude at the focal plane is given by $$U(r, \psi) = \frac{1}{\pi NA^2} \int_0^{NA} \int_0^{2\pi} e^{ik\rho r \cos(\psi-\varphi)} e^{i\Phi(\varphi)} \rho d\rho d\varphi \qquad (2)$$

with $k=2\pi/\lambda$ (see Born and Wolf, "*Principles of Optics*", Seventh Edition, Pergamon Press, chapter 9) using cylindrical coordinates at the focal plane; (r,ψ), and under the integration (ρ, φ), ρ being dimensionless. In case, one approximates the phase with the azimuthal angle under the integration $$\Phi(\varphi)=\varphi \qquad (3)$$

one obtains $$U(r, \psi) = \frac{1}{\pi NA^2} \int_0^{NA} \int_0^{2\pi} e^{ik\rho r \cos(\psi-\varphi)} e^{i\Phi(\varphi)} \rho d\rho d\varphi \qquad (4)$$

$$= \frac{2ie^{i\psi}}{NA^2} \int_0^{NA} J_1(k\rho r) \rho d\rho$$

Define the step height in such a way that at 635 nm the step introduces a phase of 2π, yielding $$h = \frac{\lambda}{n - ns}. \qquad (5)$$

where λ is the wavelength of 635 nm, n is the refractive index of the material where the steps are made of and ns is the refractive index of the surrounding medium. Here we assume that the surrounding medium is air hence ns=1.

In this specific example one then finds $h_{ex}$=1.2959 micron. These steps do therefore not influence the excitation beam.

At 735 nm this step does no longer produce phase step of 2π, but a phase equal to 0.8587*2π. In Table 1 the phase introduced at 735 nm wavelength for the various step heights is listed.

TABLE 1

List of various step heights producing a phase of a multiple of 2π at 635 nm wavelength and the corresponding phase introduced at 735 nm wavelength.

| n | Height (micron) | (Phase mod 2pi)/2pi @735 nm |
|---|---|---|
| 1 | 1.2959 | 0.8587 |
| 2 | 2.5918 | 0.7173 |
| 3 | 3.8877 | 0.5760 |
| 4 | 5.1836 | 0.4347 |
| 5 | 6.4795 | 0.2933 |
| 6 | 7.7754 | 0.1520 |
| 7 | 9.0713 | 0.0107 |

To produce a donut shaped spot distribution at the focal plane FP, the phase produced by the phase modifying member 5, or "phase plate", could be equal to $\Phi(\varphi)=\varphi$ with the angle expressed in radians.

In order to have no effect at the excitation beam, one may approximate this distribution by a stepped distribution. In Table 2, Table 3, and Table 4, lists of the various steps making up examples of phase modifying member 5 with three, four and five equal-sized segments are shown. In FIG. 4-6 cross-sections through the corresponding spot distributions in the focal plane for the depletion beam 2' are plotted. This figure shows that indeed the phase modifying member 5 introduces spot distributions with a dip or minima in the center. The optimal result in this case is for the five stepped phase modifying member 5 because in this case the value of the intensity at r=0 is the lowest. Again for the excitation beam 1, the phase modifying member 5 has no, or very little, effect.

TABLE 2

List of the various steps and the phase introduced by the steps for the depletion beam in case of a three stepped phase plate.

| j | $\Phi_{begin}/2\pi$ | $\Phi_{eind}/2\pi$ | m | $h_j$ [micron] | $\Phi_{step}/2\pi$ (mod 1) |
|---|---|---|---|---|---|
| 1 | 0 | 0.333 | 6 | 7.7754 | 0.1520 |
| 2 | 0.333 | 0.666 | 3 | 3.8877 | 0.5760 |
| 3 | 0.666 | 1.0 | 1 | 1.2959 | 0.8587 |

TABLE 3

List of the various steps and the phase introduced by the steps for the depletion beam in case of a four stepped phase plate.

| j | $\Phi_{begin}/2\pi$ | $\Phi_{eind}/2\pi$ | m | $h_j$ [micron] | $\Phi_{step}/2\pi$ (mod 1) |
|---|---|---|---|---|---|
| 1 | 0 | 0.25 | 0 | 0 | 0 |
| 2 | 0.25 | 0.50 | 5 | 7.7754 | 0.2933 |
| 3 | 0.50 | 0.75 | 3 | 3.8877 | 0.5760 |
| 4 | 0.75 | 1.0 | 1 | 1.2959 | 0.8587 |

TABLE 4

List of the various steps and the phase introduced by the steps for the depletion beam in case of a five stepped phase plate.

| j | $\Phi_{begin}/2\pi$ | $\Phi_{eind}/2\pi$ | m | $h_j$ [micron] | $\Phi_{step}/2\pi$ (mod 1) |
|---|---|---|---|---|---|
| 1 | 0 | 0.2 | 6 | 7.7754 | 0.1520 |
| 2 | 0.2 | 0.4 | 5 | 7.7754 | 0.2933 |
| 3 | 0.4 | 0.6 | 3 | 3.8877 | 0.5760 |
| 4 | 0.6 | 0.8 | 2 | 2.5918 | 0.7173 |
| 5 | 0.8 | 1.0 | 1 | 1.2959 | 0.8587 |

Figure 7:
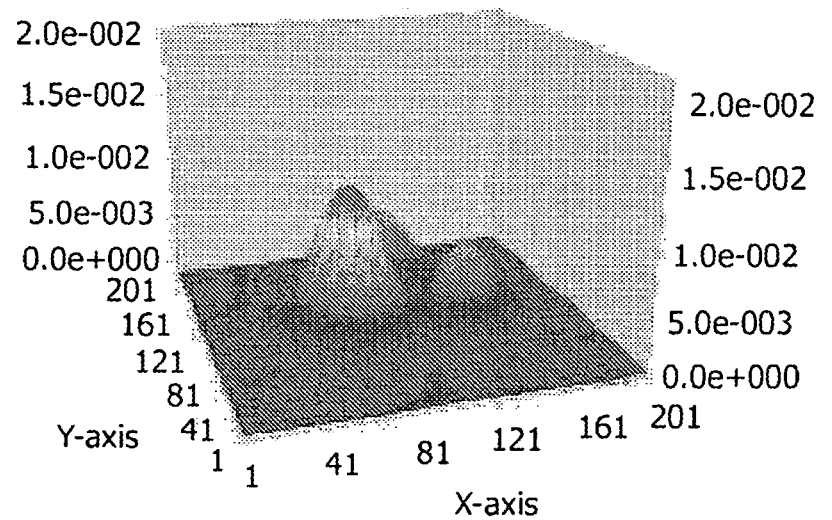
FIGS. 7 and 8 show two-dimensional intensity distributions of the spots created by the phase modifying member of Tables 2-4, and the intensity profiles of ideal phase modifying member with equal-size segments, respectively.
Figure 7:
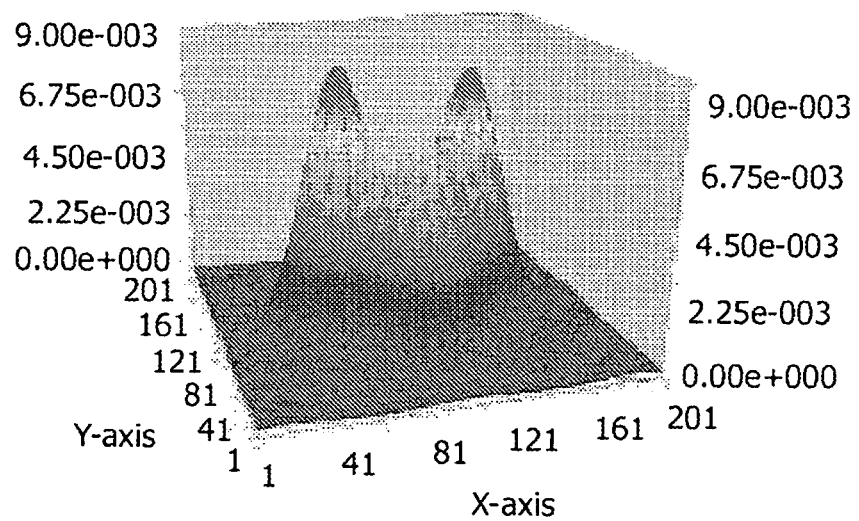
Figure 7:
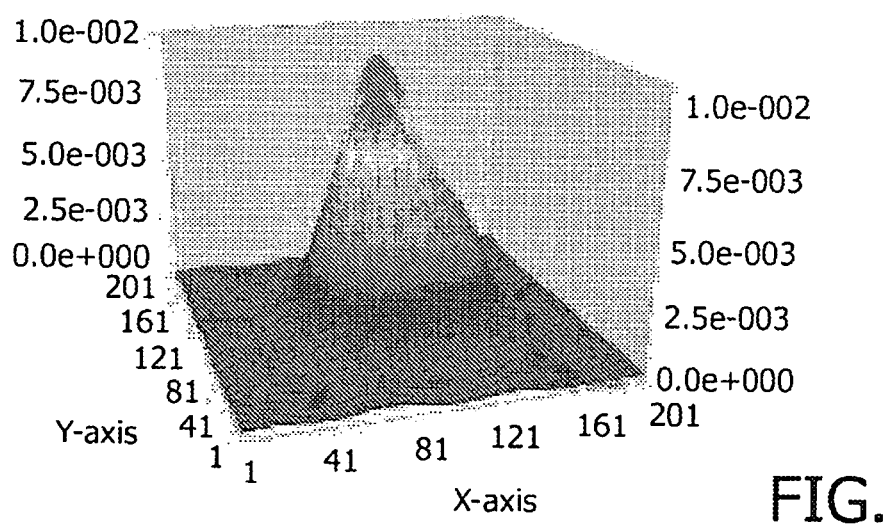
Figure 8:
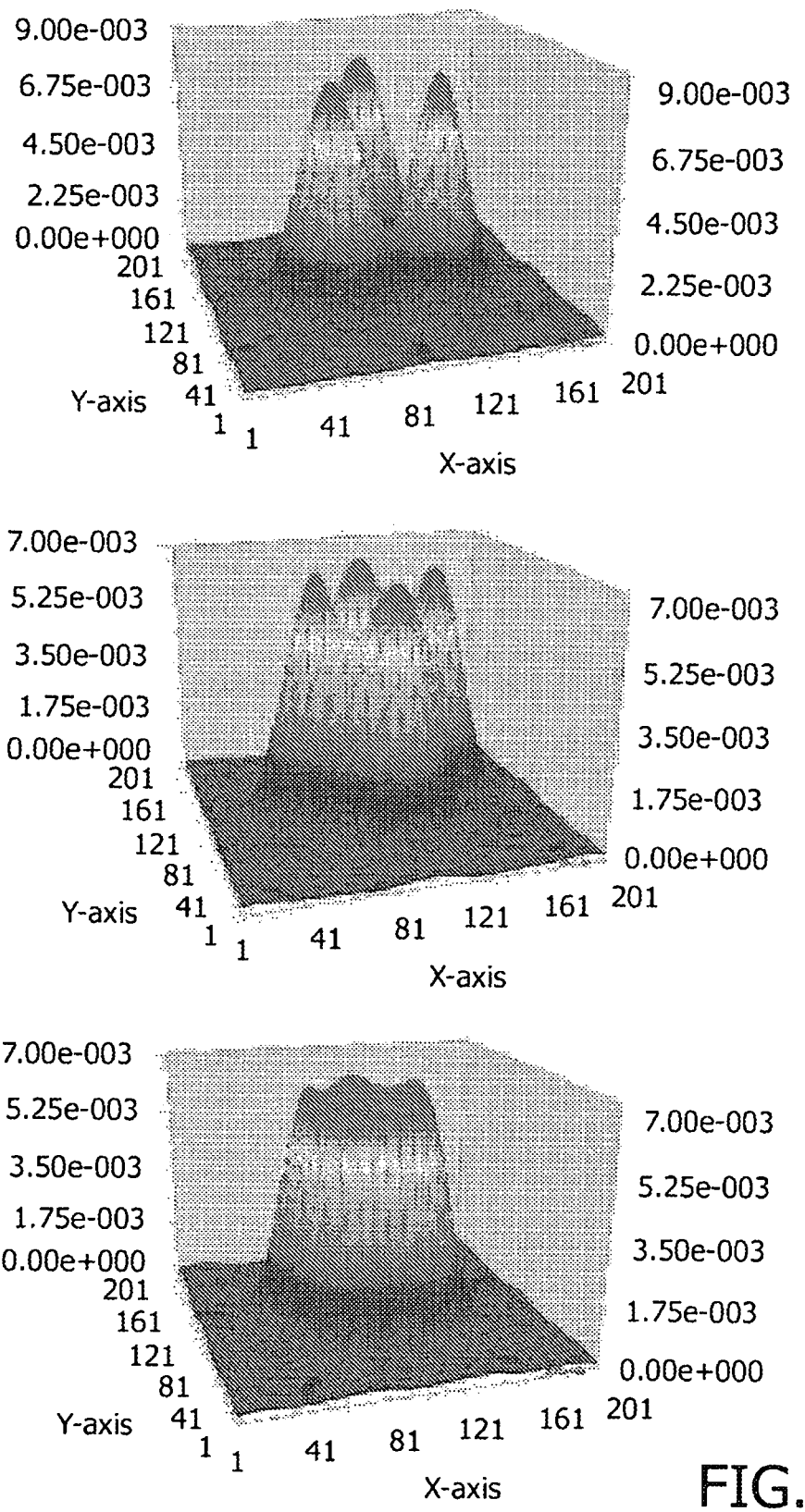

FIGS. 7 and 8 show two-dimensional intensity distributions of the spots created by the phase modifying member of Tables 2-4, and the intensity profiles of ideal phase modifying member with equal-size segments, respectively.

FIG. 7 shows the two-dimensional intensity distributions of the spots created by the phase plates of Tables 2-4. Clearly, the intensity profiles are far from rotationally symmetric. The two-dimensional intensity distributions of the spots created by the phase plates of Table 2 (left), Table 3 (center) and Table 4 (right). The x- and y-axes have a range of $[-2\lambda, 2\lambda]$.

For comparison, FIG. 8 shows the intensity profiles of ideal phase plates with equal-size segments. The spot intensity profiles of ideal phase plates with (from left to right) 3, 4 and 5 equal-size segments, are shown with phases not limited to the values of Table 1 but having their ideal values. The resulting spots show the expected 3-, 4- and 5-fold symmetry. Clearly, the 4-segment and 5-segment phase plates are to be preferred over the 3-segment phase plate, as the latter deviates most from full rotational symmetry and cannot provide uniform depletion of the fluorescence.

The spot shapes created by phase plates that have phase values limited to those in Table 1 can be improved when the segments are allowed to be of not all the same size. The additional degrees of freedom thus created can be used to make the spot more rotationally symmetric. It will now be shown how design criteria for phase plates can be derived from the so-called diffraction integral, Eq. (2). The integration over the radius in Eq. (2) can be performed analytically, yielding $$\int_0^{NA} e^{ik\rho r \cos(\psi-\varphi)} \rho d\rho = \frac{1}{a^2}(1 + (aNA - 1)e^{aNA}) \quad (6)$$

where $$a = 2\pi i \frac{r}{\lambda} \cos(\psi - \varphi) \quad (7)$$

The right-hand side of Eq. (6) can be expanded in powers of a and NA, giving $$\frac{1}{a^2}(1 + (aNA - 1)e^{aNA}) = \frac{(NA)^2}{2} + a\frac{(NA)^2}{3} + O(a^2(NA)^4) \quad (8)$$

Inserting Eqs. (6-8) back into Eq. (2), and using $$\cos(\psi-\varphi)=\cos\psi\cos\varphi+\sin\psi\sin\varphi \quad (9)$$

one arrives at $$U(r,\psi) \approx \frac{1}{2\pi}\int_0^{2\pi} e^{i\Phi(\varphi)} d\varphi + \frac{2i}{3}\frac{r}{\lambda}NA \begin{Bmatrix} \cos\psi \int_0^{2\pi} e^{i\Phi(\varphi)} \cos\varphi d\varphi + \\ \sin\psi \int_0^{2\pi} e^{i\Phi(\varphi)} \sin\varphi d\varphi \end{Bmatrix} \quad (10)$$

The integrals over $\varphi$ occurring in Eq. (10) can be performed analytically when the integration range is subdivided over the segments, as $\Phi(\varphi)$ is constant over each segment, giving sums over the segments as result:

$$U(r,\psi) \approx \frac{1}{2\pi}\sum_k w_k e^{i\Phi_k} + \frac{4i}{3}\frac{r}{\lambda}NA \begin{Bmatrix} -\cos\psi \sum_k e^{i\Phi_k} \cos\varphi_k \sin\frac{w_k}{2} + \\ \sin\psi \sum_k e^{i\Phi_k} \sin\varphi_k \sin\frac{w_k}{2} \end{Bmatrix} \quad (11)$$

where k denotes the segment number, $\Phi_k$ the segment phase (chosen from Table 1), $w_k$ the segment size (i.e. ending angle minus starting angle of segment k) and $\varphi_k$ the average segment angle (i.e. the average of starting angle and ending angle). In deriving Eq. (11), the well-known relations for differences of sines and cosines were used:

$$\sin p - \sin q = 2\cos\frac{p+q}{2}\sin\frac{p-q}{2} \quad (12)$$
$$\cos p - \cos q = -2\sin\frac{p+q}{2}\sin\frac{p-q}{2}$$

Upon inspecting Eq. (11), one notices that if one wants to have zero intensity on the optical axis (r=0), the first term on the right-hand side should be zero:

$$\sum_k w_k e^{i\Phi_k} = 0 \quad (13)$$

Furthermore, to have an intensity profile of the depleting beam in the vicinity of the optical axis which is as rotationally symmetric as possible, one would like the intensity $|U(r,\psi)|^2$ to become independent of $\psi$. This will be achieved when the ratio of the factors occurring with $\cos\psi$ and $\sin\psi$ in Eq. (11) is as follows:

$$\frac{\sum_k e^{i\Phi_k}\cos\varphi_k \sin\frac{w_k}{2}}{\sum_k e^{i\Phi_k}\sin\varphi_k \sin\frac{w_k}{2}} = \pm i \quad (14)$$

This can be understood by considering the following relation:

$$|A\cos\psi + B\sin\psi|^2 = \quad (15)$$

$$|A|^2\left(\cos^2\psi + \left|\frac{B}{A}\right|^2\sin^2\psi + \left[\frac{B}{A} + \left(\frac{B}{A}\right)^*\right]\sin\psi\cos\psi\right) =$$

$$|A|^2\left(1 + \left(\left|\frac{B}{A}\right|^2 - 1\right)\sin^2\psi + \text{Re}\left(\frac{B}{A}\right)\sin 2\psi\right)$$

(A, B complex). Eq. (15) becomes independent of $\psi$ when $B/A=\pm i$, in which case one has $|B/A|^2=1$ and $\text{Re}(B/A)=0$. In Eq. (15), A and B stand for the factors occurring with $\cos\psi$ and $\sin\psi$ in Eq. (11), which form the denominator and numerator in Eq. (14). Using this, an alternative but equivalent formulation of Eq. (14) in terms of factors proportional to the intensity variation with $\psi$ is $$\left|\frac{\sum_k e^{i\Phi_k}\cos\varphi_k \sin\frac{w_k}{2}}{\sum_k e^{i\Phi_k}\sin\varphi_k \sin\frac{w_k}{2}}\right|^2 - 1 = 0 \quad (14')$$

$$\text{Re}\left(\frac{\sum_k e^{i\Phi_k}\cos\varphi_k \sin\frac{w_k}{2}}{\sum_k e^{i\Phi_k}\sin\varphi_k \sin\frac{w_k}{2}}\right) = 0$$

In summary, Eqs (13) and (14') provide design rules for the phase modifying members or phase plates 5: given a set of phases $\Phi_k$, the starting and ending angles of the segments must be chosen such that Eqs. (13) and (14') are fulfilled as well as possible. Alternatively, these design rules can also be used to select phases $\Phi_k$ from a set of possible phases if the segment sizes are in some way predetermined: those phases should be chosen which fulfill Eqs. (13) and (14') as well as possible.

In principle, further design rules can be created by expanding Eq. (8) to higher order in a and repeating the above derivation including these higher orders.

Figure 9:
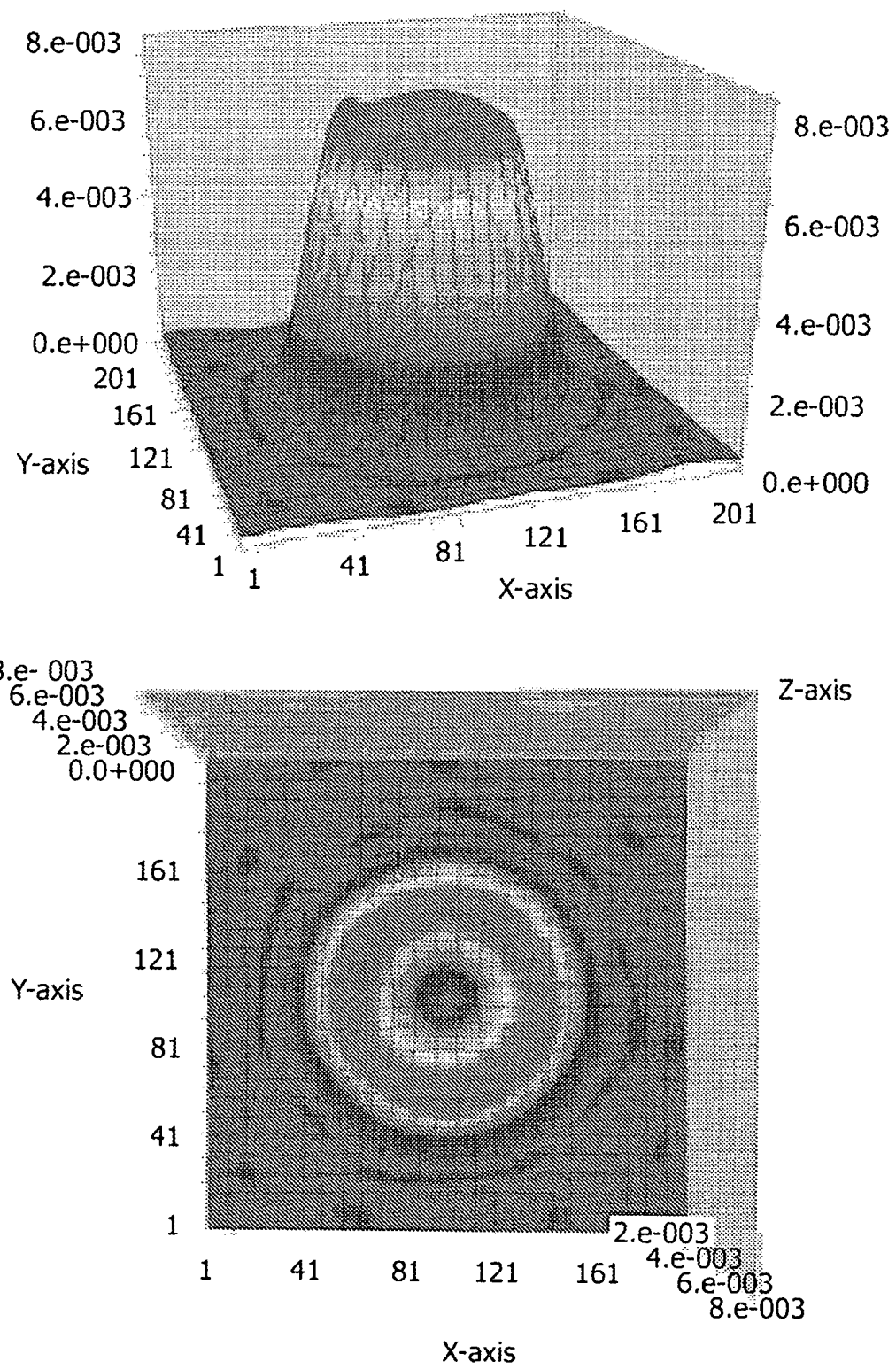
FIG. 9 shows the two-dimensional intensity distributions of the spot created by the phase modifying member with 7 segments.

An example of a spot created by a 7-segment phase modifying member 5 designed using Eqs. (13) and (14') is shown in FIG. 9. Note the near-perfect rotational symmetry near the center of the spot. The parameters of the phase plate design are listed in Table 5.

TABLE 5

List of the various steps and the phase introduced by the steps for the depletion beam in case of a seven stepped phase plate.

| j | $\Phi_{begin}/2\pi$ | $\Phi_{eind}/2\pi$ | m | $h_j$ [micron] | $\Phi_{step}/2\pi$ (mod 1) |
|---|---|---|---|---|---|
| 1 | 0 | 0.1551 | 0 | 0 | 0 |
| 2 | 0.1551 | 0.2907 | 6 | 7.7754 | 0.1520 |
| 3 | 0.2907 | 0.4413 | 5 | 6.4795 | 0.2933 |
| 4 | 0.4413 | 0.5738 | 4 | 5.1836 | 0.4347 |
| 5 | 0.5738 | 0.7184 | 3 | 3.8877 | 0.5760 |
| 6 | 0.7184 | 0.8652 | 2 | 2.5918 | 0.7173 |
| 7 | 0.8652 | 1.0 | 1 | 1.2959 | 0.8587 |

Fluorescence light captured by the optical element 6 (functioning also as collecting objective) has to pass through the phase plate 5 before it is captured by the fiber end. This will have a donut shape too. To avoid problems with the detection one may employ alternative methods like detecting the light back through the cladding of the fiber, e.g. as described in OPTICS EXPRESS 5528, July 2005, Vol. 13, No. 14, *Nonlinear optical microscopy based on double-clad photonic crystal fibers* by Ling Fu et al.

Figure 10:
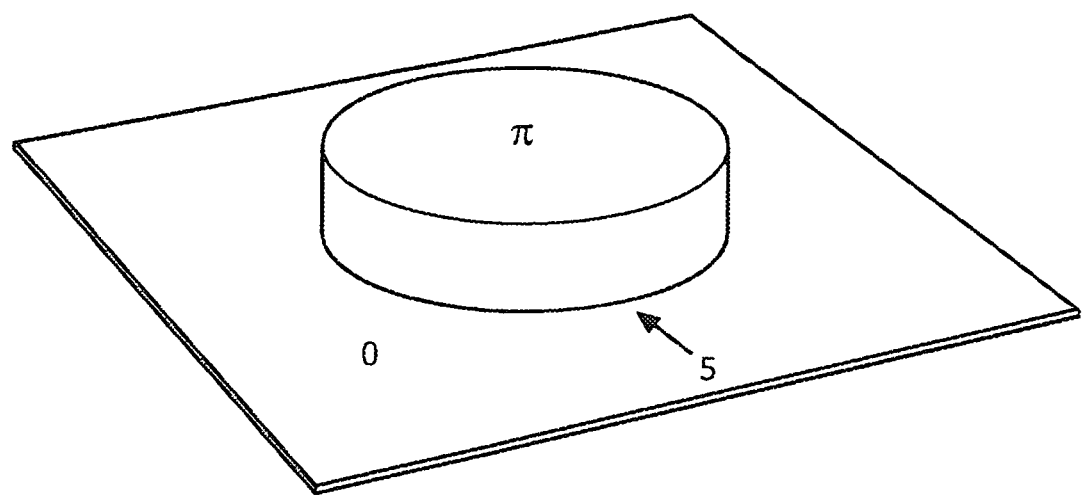
FIG. 10 shows an embodiment of a stepped phase modifying member with a circular configuration according to another embodiment of the present invention.

FIG. 10 shows an embodiment of a stepped phase modifying member with a circular configuration according to another embodiment of the present invention. Another way to produce a hollow spot is by using a stepped phase plate as shown in FIG. 7. Let the step occur at a fraction of b of the radius of the entrance pupil. Furthermore, let the intensity of the distribution be isotropic and the phase introduced by the step be Q. The amplitude distribution at the focal plane is then given by $$U(r,\psi) = \frac{1}{\pi NA^2}\int_0^{NA}\int_0^{2\pi} e^{ik\rho\cos(\psi-\varphi)}e^{i\Phi(\varphi,\rho)}\rho\,d\rho\,d\varphi \quad (16)$$

$$= \frac{1}{\pi NA^2}\int_0^{bNA}\int_0^{2\pi} e^{ik\rho\cos(\psi-\varphi)}e^{iQ}\rho\,d\rho\,d\varphi +$$

$$\frac{1}{\pi NA^2}\int_{bNA}^{NA}\int_0^{2\pi} e^{ik\rho\cos(\psi-\varphi)}\rho\,d\rho\,d\varphi$$

$$= \frac{e^{iQ}-1}{\pi NA^2}\int_0^{bNA}\int_0^{2\pi} e^{ik\rho\cos(\psi-\varphi)}\rho\,d\rho\,d\varphi +$$

$$\frac{1}{\pi NA^2}\int_0^{NA}\int_0^{2\pi} e^{ik\rho\cos(\psi-\varphi)}\rho\,d\rho\,d\varphi$$

$$= 2b^2(e^{iQ}-1)\int_0^1 J_0(krbNA\rho)d\rho +$$

$$2\int_0^1 J_0(krNA\rho)d\rho$$

$$= 2b^2(e^{iQ}-1)\frac{J_1(krbNA)}{krbNA} + 2\frac{J_1(krNA)}{krNA}.$$

When for instance $Q=\pi$ and $b=1/\sqrt{2}$ the intensity distribution will be zero at $r=0$. In a similar way as above we can now choose the step to have a height of 5.1836 micron (n=4) producing a phase step of 0.4347 times $2\pi$ for depletion beam and has no effect on the excitation beam. Since the phase step is close to $\pi$ for the depletion beam the spot will have a substantially donut shape.

In addition to the azimuthally stepped phase plate embodiment of FIG. 3 and the rotationally symmetric radially stepped embodiment of FIG. 10, embodiments that are stepped in both azimuthal and radial directions may be used within the teaching and general principle of the present invention, such as, but not limited to, combinations of a radial step as in FIG. 10 with a ring of azimuthal steps, or an azimuthally stepped phase plate where some, or all, of the segments are subdivided in the radial direction (possibly with boundary radii different per segment) so as to optimize the spot profile.

Figure 11:
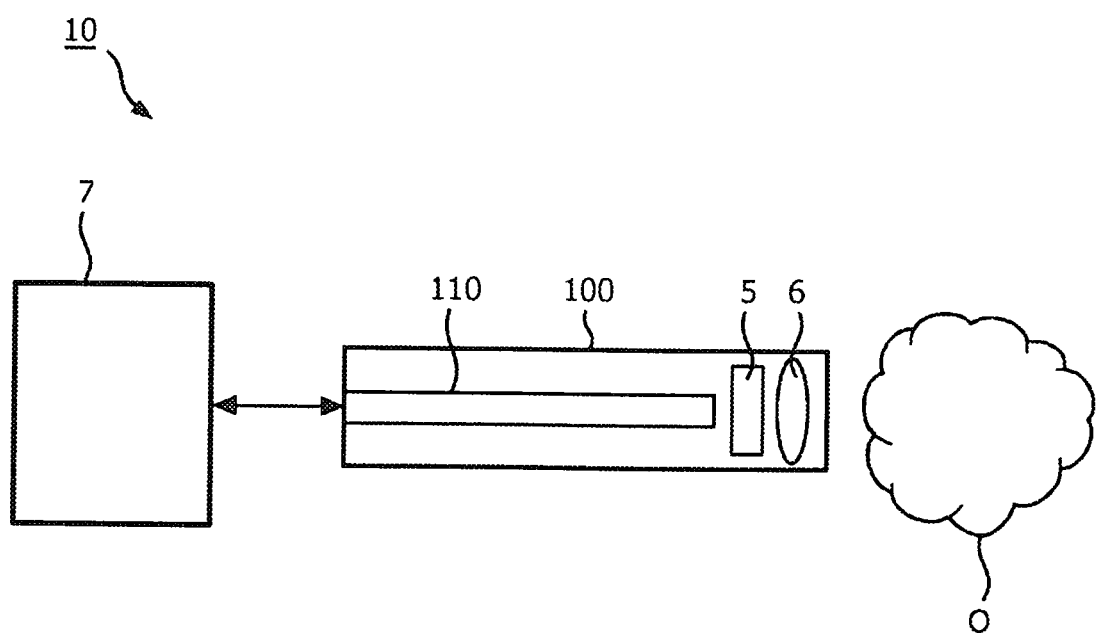
FIG. 11 shows an optical sub-unit according to the present invention.

FIG. 11 shows an optical sub-unit 100 arranged for optical imaging of an object O using stimulated emission depletion (STED) in an optical microscopy system 10, having radiation generating means 7 capable of emitting a first 1 and a second 2 beam according to the invention (beams not shown in FIG. 11), the means 7 being optically connected to the sub-unit 100 as schematically indicated by the double-arrow. The optical sub-unit 100 comprises optical guiding means 110, e.g. an optical fiber or other suitable optical elements, for guiding the first and the second beam through the sub-unit, the sub-unit further comprises:

the optical element 6 for focusing the first and the second beam on the object O, the optical element being arranged relative to the radiation generating means for defining a common optical path for both the first and the second beam, and the phase modifying member 5 inserted in the common optical path, The optical sub-unit 100, or elements thereof, may constitutes part of an endoscope, a catheter, or a needle, or a biopsy needle for medical imaging, e.g. for in-vivo optical imaging and diagnostics.

Figure 12:
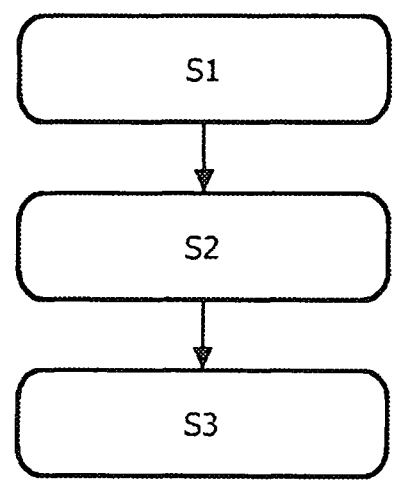
FIG. 12 is a flow chart of a method according to the present invention.

FIG. 12 is a flow chart of a method according to the present invention, the method comprising the steps of:

S1 emitting radiation comprising a first 1 and a second 2 beam, the first beam being an excitation beam, the second beam being a depletion beam relative to the first beam, S2 focusing the first and the second beam on the object using an optical element 6, the optical element defining a common optical path OP for both the first and the second beam, and S3 providing a phase modifying member 5 in said common optical path, wherein the phase modifying member 5 is optically arranged for leaving the wavefront of the first beam substantially unchanged, and for changing the wavefront of the second beam 2' so as to create an undepleted region of interest in the object.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An optical microscopy system, comprising:

a light source capable of emitting a first beam and a second beam, wherein the first beam is an excitation beam, wherein the second beam is a depletion beam relative to the first beam, an optical element for focusing the first beam and the second beam on an associated object, wherein the optical element is arranged relative to the light source for defining a common optical path for both the first beam and the second beam, and a phase modifying member manufactured in one optical material and inserted in said common optical path, wherein the phase modifying member is optically arranged for leaving the wavefront of the first beam substantially unchanged, and for changing the wavefront of the second beam, wherein the phase modifying member is capable of modifying the wavefront of the second beam by having a surface with a plurality of regions wherein the plurality of region comprises a first region and a second region, wherein the first region has a protruded height, wherein the protruded height is above the height of the second region, wherein the plurality of regions are arranged in an azimuthal configuration, wherein each region is positioned within its respective segment having a starting angle and an ending angle, wherein segment size of one of the plurality of regions is equal to the ending angle minus the starting angle of the segment, wherein the second beam spot amplitude, U, at the focal plane of the focusing optical element is arranged to be rotationally symmetric around the common optical path by selecting the starting and ending angles of the segment of each of the plurality of regions such that the phase modifying member fulfills the condition that absolute values of the following expressions:

$$\left| \frac{\sum_k e^{i\Phi_k} \cos\varphi_k \sin\frac{w_k}{2}}{\sum_k e^{i\Phi_k} \sin\varphi_k \sin\frac{w_k}{2}} \right|^2 - 1$$

and $$\mathrm{Re}\left( \frac{\sum_k e^{i\Phi_k} \cos\varphi_k \sin\frac{w_k}{2}}{\sum_k e^{i\Phi_k} \sin\varphi_k \sin\frac{w_k}{2}} \right)$$

are minimized;

where k denotes the segment number, $\Phi_k$ the segment phase, $w_k$ the segment size which equals the ending angle minus the starting angle of segment k, and $\varphi_k$ the average segment angle which equals to an average of the starting angle and the ending angle, and wherein the second beam spot amplitude, U, at the focal plane of the focusing optical element is arranged to be substantially zero at a central position of the optical path (r=0) by selecting the same starting and ending angles of the segment of each of the plurality of regions such that the phase modifying member approximately fulfills the equation:

$$\sum_k w_k e^{i\Phi_k} = 0,$$

where k denotes the segment number, $\Phi_k$ the segment phase, $w_k$ the segment size which equals the ending angle minus the starting angle of segment k.

2. The system according to claim 1, wherein at least said optical element and the phase modifying member is positioned in an endoscope, a catheter, a needle or a biopsy needle for medical imaging.

3. The system of claim 1, further comprising:
at least one of an optical material and an optical medium interfacing the phase modifying member.

4. The system according to claim 1, wherein segment sizes of the plurality of regions are not of the same size.

5. An optical sub-unit, comprising:
an optical fiber arranged to guide a first beam and a second beam through the optical sub-unit, wherein the first beam and second beam are emitted by a light source of an associated optical microscopy system, wherein the first beam is an excitation beam, and wherein the second beam is a depletion beam relative to the first beam,
an optical element arranged to focus the first beam and the second beam on an associated object, wherein the optical element is arranged relative to the light source for defining a common optical path for both the first and the second beam, and
a phase modifying member manufactured in one optical material and inserted in said common optical path,
wherein the phase modifying member is optically arranged for leaving the wavefront of the first beam substantially unchanged, and for changing the wavefront of the second beam,
wherein the phase modifying member is capable of modifying the wavefront of the second beam by having a surface with a plurality of regions,
wherein the plurality of regions comprise a first region and a second region,
wherein the first region has a protruded height,
wherein the protruded height is above the height of the second region,
wherein the plurality of regions are arranged in an azimuthal configuration,
wherein each region is positioned within its respective segment having a starting angle and an ending angle,
wherein segment size of one of the plurality of regions is equal to the ending angle minus the starting angle of the segment,
wherein the second beam spot amplitude, U, at the focal plane of the focusing optical element is arranged to be rotationally symmetric around the common optical path by selecting the starting and ending angles of the segment of each of the plurality of regions such that the phase modifying member fulfills the condition that absolute values of the following expressions:

$$\left| \frac{\sum_k e^{i\Phi_k} \cos\varphi_k \sin\frac{w_k}{2}}{\sum_k e^{i\Phi_k} \sin\varphi_k \sin\frac{w_k}{2}} \right|^2 - 1 \text{ and}$$

$$\mathrm{Re}\left( \frac{\sum_k e^{i\Phi_k} \cos\varphi_k \sin\frac{w_k}{2}}{\sum_k e^{i\Phi_k} \sin\varphi_k \sin\frac{w_k}{2}} \right)$$

are minimized;
where k denotes the segment number, $\Phi_k$ the segment phase, $w_k$ the segment size which equals the ending angle minus the starting angle of segment k, and $\varphi_k$ the average segment angle which equals to an average of the starting angle and the ending angle, and
wherein the second beam spot amplitude, U, at the focal plane of the focusing optical element is arranged to be substantially zero at a central position of the optical path (r=0) by selecting the same starting and ending angles of the segment of each of the plurality of regions such that the phase modifying member approximately fulfills the equation:

$$\sum_k w_k e^{i\Phi_k} = 0,$$

where k denotes the segment number, $\Phi_k$ the segment phase, $w_k$ the segment size which equals the ending angle minus the starting angle of segment k.

6. The optical sub-unit according to claim 5, wherein the optical sub-unit forms part of an endoscope, a catheter, a needle or a biopsy needle for medical imaging.

7. The optical sub-unit of claim 5, further comprising:
at least one of an optical material and an optical medium interfacing the phase modifying member.

8. The optical sub-unit according to claim 5, wherein segment sizes of the plurality of regions are not of the same size.

9. A method, comprising:
emitting radiation comprising a first beam and a second beam, wherein the first beam is an excitation beam, wherein the second beam is a depletion beam relative to the first beam,
focusing the first beam and the second beam on an object using an optical element, the optical element defining a common optical path for both the first beam and the second beam, and
providing a phase modifying member manufactured in one optical material and in said common optical path,
wherein the phase modifying member is optically arranged for leaving the wavefront of the first beam substantially unchanged, wherein the phase modifying member is optically arranged to change the wavefront of the second beam so as to create an undepleted region of interest in the object,
wherein the phase modifying member is capable of modifying the wavefront of the second beam by having a surface with a plurality of regions,
wherein the plurality of region comprise a first region and a second region,
wherein the first region has a protruded height,
wherein the protruded height is above the height of the second region,
wherein the plurality of regions are arranged in an azimuthal configuration, wherein each region is positioned within its respective segment having a starting angle and an ending angle, wherein segment size of one of the plurality of regions is equal to the ending angle minus the starting angle of the segment, wherein the second beam spot amplitude, U, at the focal plane of the focusing optical element is arranged to be symmetric around the common optical path by selecting the starting and ending angles of the segment of each of the plurality of regions such that the phase modifying member fulfills the condition that absolute values of the following expressions:

$$\left| \frac{\sum_k e^{i\Phi_k} \cos\varphi_k \sin\frac{w_k}{2}}{\sum_k e^{i\Phi_k} \sin\varphi_k \sin\frac{w_k}{2}} \right|^2 - 1 \text{ and}$$

$$\mathrm{Re}\left( \frac{\sum_k e^{i\Phi_k} \cos\varphi_k \sin\frac{w_k}{2}}{\sum_k e^{i\Phi_k} \sin\varphi_k \sin\frac{w_k}{2}} \right)$$

are minimized;

where k denotes the segment number, $\Phi_k$ the segment phase, $w_k$ the segment size which equals the ending angle minus the starting angle of segment k, and $\varphi_k$ the average segment angle which equals to an average of the starting angle and the ending angle, and wherein the second beam spot amplitude, U, at the focal plane of the focusing optical element is arranged to be substantially zero at a central position of the optical path (r=0) by selecting the same starting and ending angles of the segment of each of the plurality of regions such that the phase modifying member approximately fulfills the equation:

$$\sum_k w_k e^{i\Phi_k} = 0,$$

where k denotes the segment number, $\Phi_k$ the segment phase, $w_k$ the segment size which equals the ending angle minus the starting angle of segment k.

10. The method of claim 9, wherein at least one of an optical material and an optical medium interfaces the phase modifying member.

11. The method according to claim 9, wherein segment sizes of the plurality of regions are not of the same size.

* * * * *